United States Patent [19]

Hamprecht et al.

[11] Patent Number: 4,988,752

[45] Date of Patent: Jan. 29, 1991

[54] COLORED THERMOPLASTIC RESIN COMPOSITION

[75] Inventors: Rainer Hamprecht, Odenthal-Blecher; Michael Kressner, Leichlingen; Georg Pape, Leverkusen, all of Fed. Rep. of Germany

[73] Assignee: Bayer Aktiengesellschaft, Leverkusen, Fed. Rep. of Germany

[21] Appl. No.: 359,247

[22] Filed: May 31, 1989

[30] Foreign Application Priority Data

Jun. 14, 1988 [DE] Fed. Rep. of Germany ....... 3820191

[51] Int. Cl.$^5$ .......................... C08J 3/20; C08K 5/23; C08L 25/04; C08L 33/12
[52] U.S. Cl. .................................. 524/190; 524/560; 524/577; 524/611
[58] Field of Search ......................... 524/190

[56] References Cited

U.S. PATENT DOCUMENTS

| | | | |
|---|---|---|---|
| 2,084,399 | 6/1937 | Kuettel | 524/190 |
| 4,105,655 | 8/1978 | Gottschlich et al. | |
| 4,524,168 | 6/1985 | Wick | 524/190 |
| 4,812,141 | 3/1989 | Baumgartner | 524/190 |

FOREIGN PATENT DOCUMENTS 025903 4/1981 European Pat. Off. .
3404130 2/1984 Fed. Rep. of Germany .

*Primary Examiner*—C. Warren Ivy
*Attorney, Agent, or Firm*—Sprung Horn Kramer & Woods

[57] ABSTRACT

Process for the coloring of thermoplastics in the mass, characterized in that dyestuffs of the formula

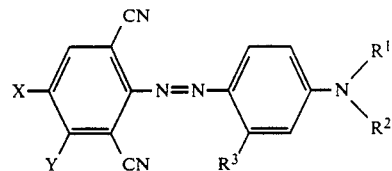

are used in which
X denotes H, alkyl, preferably $C_1$–$C_6$-alkyl, cycloalkyl, preferably $C_5$–$C_6$-cycloalkyl, $CF_3$, halogen, preferably F, Cl, Br,
Y denotes H, alkyl, preferably $C_1$–Chd 6-alkyl, in particular $CH_3$, halogen, preferably F, Cl, Br,
$R^1$ denotes alkyl, preferably $C_1$–$C_6$-alkyl, alkoxyalkyl, preferably $C_1$–$C_4$-alkoxy-$C_2$–$C_4$-alkyl, phenyl-$C_1$–$C_6$-alkyl which is unsubstituted or substituted in the phenyl radical, for example by $CH_3$, Cl or Br,
$R^2$ denotes alkyl, preferably $C_1$–$C_6$-alkyl, alkoxyalkyl, preferably $C_1$–$C_6$-alkoxy-$C_2$–$C_4$-alkyl, phenyl-$C_1$–$C_6$-alkyl which is unsubstituted or substituted in the phenyl radical, for example by $CH_3$, Cl, Br, and
$R^3$ denotes H, alkyl, preferably $C_1$–$C_6$-alkyl, in particular $CH_3$.

8 Claims, No Drawings

COLORED THERMOPLASTIC RESIN COMPOSITION

The invention relates to a process for the colouring of thermoplastics in the mass, characterized in that dyestuffs of the formula

are used in which

X denotes H, alkyl, preferably $C_1-C_6$-alkyl, cycloalkyl, preferably $C_5-C_6$-cycloalkyl, $CF_3$, halogen, preferably F, Cl, Br, Y denotes H, alkyl, preferably $C_1-C_6$-alkyl, in particular $CH_3$, halogen, preferably F, Cl, Br, $R^1$ denotes alkyl, preferably $C_1-C_6$-alkyl, alkoxyalkyl, preferbly $C_1-C_4$-alkoxy-$C_2-C_4$-alkyl, phenyl-$C_1-C_5$-alkyl which is unsubstituted or substituted in the phenyl radical, for example by $CH_3$, Cl or Br, $R^2$ denotes alkyl, preferably $C_1-C_6$-alkyl, alkoxyalkyl, preferably $C_1-C_5$-alkoxy-$C_2-C_4$-alkyl, phenyl-$C_1-C_6$-alkyl which is unsubstituted or substituted in the phenyl radical, for example by $CH_3$, Cl, Br, and $R^3$ denotes H, alkyl, preferably $C_1-C_6$-alkyl, in particular $CH_3$.

Preference is also given to dyestuffs of the formula I with the following substitution patterns:

I.1. $X=C_1-C_6$-alkyl, Cl, Br, $CH_3$; Y=H, $CH_3$, Cl; $R^1$, $R^2=C_1-C_4$-alkyl, $C_1-C_4$-alkoxy-$C_2-C_4$-alkyl; $R^3$ =H, $CH_3$ I.2. $X=C_1-C_6$-alkyl; Y=H; $R^1$, $R^2$=linear $C_1-C_6$-alkyl, $C_1-C_2$-alkoxyethyl; $R^3=CH_3$ I.3. $X=C_1C_4$-alkyl; Y=H; $R^1$, $R^2$=linear $C_1-C_4$-alkyl; $R^3=CH_3$ I.4. $X=CH_3$; Y=H; $R^1$, $R^2$=methyl, ethyl, n-propyl; $R^3=CH_3$.

The dyestuffs to be used according to the invention are known or can be prepared in analogy to processes known from the literature (see, for example, EP-OS No. 25,903, German Offenlegungsschrift, No. 3,404,130 and German Offenlegungsschrift No. 1,794,402), which is equivalent to U.S. Pat. No. 4,105,655, the contents of which are incorporated herein by reference.

They are preferably prepared by the so-called cyano exchange, such as is described, for example, in the publications mentioned.

Examples of suitable thermoplastics are: cellulose esters such as cellulose nitrate, cellulose acetate, cellulose triacetate, cellulose acetobutyrate, cellulose propionate, cellulose ethers such as methylcellulose, ethylcellulose, benzylcellulose, linear saturated polyester resin plastics, aniline resin plastics, polycarbonates, polystyrene, polyvinylcarbazole, polyvinyl chloride, in particular rigid PVC, polymethacrylate, polyvinylidene chloride, polyacrylonitrile, polyoxomethylene, linear polyurethanes and copolymers such as vinyl chloride/vinyl acetate copolymers and in particular styrene copolymers such as styrene/acrylonitrile copolymers (SAN), styrene/butadiene copolymers (SB) and styrene/α-methylstyrene copolymers (SMS).

The high-molecular-weight compounds mentioned can be present individually or in mixtures as plastic masses or melts which can be, if desired, spun to give fibers.

The novel process is in particular suitable for the mass colouring of polystyrene, in particular for the mass colouration of poly(meth)acrylates, preferably polymethyl methacrylate.

The plastics to be coloured are expediently intimately mixed with the dyestuff in the form of powders, chips or granules. This can take place, for example, by coating of the plastic particles with the finely divided dry dye-stuff powder or by treatment of the particles with a solution or dispersion of the dyestuff in an organic solvent, followed by removal of the solvent.

Mixtures of various dyestuffs of the formula I and/or mixtures of dyestuffs of the formula I with other dyestuffs and/or inorganic or organic pigments can also be used in the process according to the invention.

The process according to the invention can also be carried out in such a manner that the dyestuff is added to the monomer (mixture) or to a prepolymer before or during the polymerization, for example by dissolving the dyestuff in the monomer (mixture).

The ratio of dyestuff to plastic can vary within wide limits, depending on the colour strength desired. In general it is recommended to use 0.005-30 parts, preferably 0.01-3 parts, of dyestuff per 100 parts of plastic.

After the treatment, the polymer particles are melted in the extruder by known processes and extruded to give articles, for example films or fibers, or cast to give sheets.

The colouring of the plastics by means of the dyestuffs of the formula (I) is for example carried out by mixing this dyestuff, if appropriate in the form of master batches, with these substrates using rolls, mixing or milling apparatuses. The coloured material is then converted into the desired final form by processes known per se such as calendering, pressing, extruding, brushing, casting or injection-moulding.

For preparing non-rigid mouldings or decreasing their brittleness, it is often desirable to incorporate so-called plasticizers in the high-molecular-weight compounds before the moulding. These can be, for example, esters of phosphoric acid, phthalic acid or sebacic acid. In the process according to the invention, the plasticizers can be incorporated in the polymers before or after the incorporation of the dyestuff. It is also possible to add, in addition to the compounds of the formula (I), fillers or other colouring components such as white pigments, coloured pigments or black pigments in any desired amounts, in order to achieve different shades.

The (yellowish to bluish) red colourings obtained are distinguished by good lightfastness and resistance to weathering. Moreover, the dyestuffs according to the invention have very good heat resistance in the thermoplastics. This property is extremely surprising for azo dyestuffs and could not have been expected.

Because of the insufficient heat resistance of azo dyestuffs, preferably anthraquinone dyestuffs are used in industry. Compared with the latter, for example C.I. Solvent Red 111, the dyestuffs used according to the invention are distinguished by better resistance to sublimation and in particular much higher colour strength, which makes the process according to the invention particularly economical.

EXAMPLE 1

0.1 g of the dyestuff of the formula

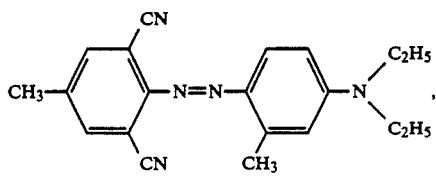   A 2 g of titanium dioxide (Bayertitan ® R-FK-2) and 100 g of polystyrene granules are mixed in a sealed vessel on a castor for 2 hours. The mixture obtained is extruded at about 230° C. in strands 2 cm wide and again granulated. The granules are injected-moulded at 230°-240° C. by means of an injection-moulding machine to give formulations. This gives red-coloured mouldings having a high light resistance.

EXAMPLE 2

0.02 g of the dyestuff of the formula A and 100 g of polystyrene granules are mixed in a sealed vessel on a castor for 2 hours. The mixture is then injection-moulded at 230°-240° C. by means of a screw injection-moulding machine to give mouldings. The red-coloured transparent mouldings have high lightfastness.

EXAMPLE 3

The procedure as described in Example 1 is repeated, except that the dyestuff of the formula I is replaced by the dyestuff of the formula

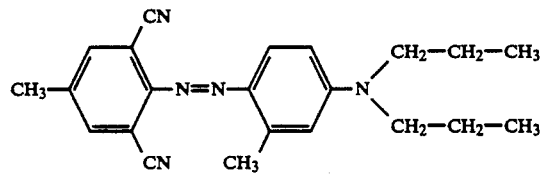   B, to give coloured mouldings having high lightfastness.

EXAMPLE 4

The procedure as described in Example 2 is repeated, except that 0.035 g of the dyestuff of the formula B and 100 g of polystyrene granules are mixed, to give red-coloured transparent mouldings having high lightfastness.

EXAMPLE 5

0.03 g of the dyestuff of the formula A are dissolved in 99.97 g of methyl methacrylate. After the addition of 0.1 g of dibenzoyl peroxide, the solution is heated to 120° C., and the polymerization is started. After 30 minutes, the partially polymerized methyl methacrylate is allowed to complete the polymerization between two glass plates at 80° C. over a period of 10 hours. This gives red-coloured transparent polymethyl methacrylate sheets.

EXAMPLE 6

0.02 g of the dyestuff of the formula B and 100 g of polymethyl methacrylate are mixed while dry and homogenized at 240° C. on a two-shaft extruder. The material leaving the extruder in the form of strands is granulated. It can then be extruded to give mouldings. This gives a transparent coloured plastic having very good lightfastness and resistance to weathering.

EXAMPLE 7

100 g of a commercially available polycarbonate are mixed in the form of granules with 0.01 g of the solid of the formula A while dry. The granules thus obtained are homogenized at 290° C. on a two-shaft extruder. This gives a transparent red colouring having good lightfastness. The coloured polycarbonate is removed from the extruder in the form of strands and processed to give granules. The granules can be processed by the customary methods of the making-up of thermoplastic masses.

EXAMPLE 8

0.04 g of the solid of the formula B are mixed with 100 g of styrene/acrylonitrile copolymer while dry and homogenized at 190° C. in a two-shaft extruder, granulated and can then be injection-moulded in a conventional manner to give mouldings. This gives a transparently coloured plastic having good lightfastness. If the procedure is an opaque colouring is obtained.

EXAMPLE 9

The procedure as described in Example 1 is repeated, except that the dyestuff of the formula A is replaced by the dyestuff of the formula

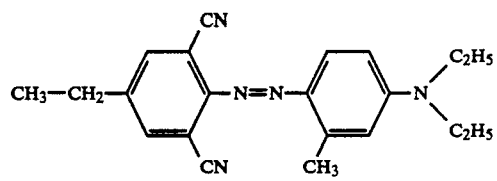

to give red-coloured mouldings having high lightfastness.

What is claimed is:

1. A process for the coloration in the mass of a thermoplastic selected from the group consisting of a styrene/acrylonitrile copolymer, styrene/butadiene copolymer, styrene/α-methylstyrene copolymer, polystyrene, a poly(meth)acrylate and polycarbonate, comprising mixing a dyestuff with granules of the plastic, extruding this mixture in strands, again granulating and converting them into the desired final form by calendering, pressing, extruding or injection molding, the dyestuffs being of the formula

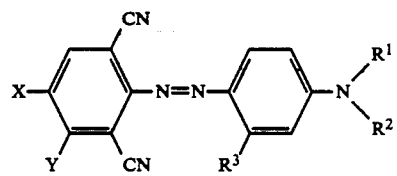   I in which
X denotes $C_1$-$C_6$-alkyl, $CF_3$, Cl or Br,
Y denotes H, $CH_3$ or Cl,
$R^1$ denotes $C_1$-$C_4$-alkyl or $C_1$-$C_4$-alkoxy-$C_2$-$C_4$-alkyl,
$R^2$ denotes $C_1$-$C_4$-alkyl, $C_1$-$C_4$-alkoxy-$C_2$-$C_4$-alkyl and
$R^3$ denotes H or $CH_3$.

2. A process according to claim 1, wherein dyestuffs of formula I are used in which
X signifies $C_1$–$C_6$-alkyl,
Y signifies H,
$R^1$, $R^2$ signify linear $C_1$–$C_4$-alkyl or $C_1$–$C_2$-alkoxyethyl and
$R^3$ signifies $CH_3$.

3. A process according to claim 1, wherein dyestuffs of the formula I are used in which
X signifies $C_1$–$C_6$-alkyl,
Y signifies H,
$R^1$, $R^2$ signifies linear $C_1$–$C_4$-alkyl and
$R^3$ signifies $CH_3$.

4. A process according to claim 1, wherein dyestuffs of the formula I are used in which
X signifies $CH_3$,
Y signifies H,
$R^1$, $R^2$ signify methyl, ethyl or n-propyl and
$R^3$ signifies $CH_3$.

5. A process according to claim 1, wherein the dyestuff is of the formula

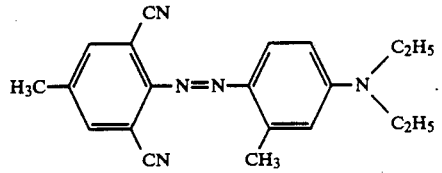

6. A process according to claim 1, wherein the thermoplastic resin is polystyrene or a styrene copolymer.

7. A process according to claim 1, wherein the thermoplastic resin is a polymethacrylate.

8. A process according to claim 1, wherein the thermoplastic resin is polymethyl methacrylate.

* * * * *

UNITED STATES PATENT AND TRADEMARK OFFICE
CERTIFICATE OF CORRECTION

PATENT NO. : 4,988,752

DATED : January 29, 1991

INVENTOR(S) : Hamprecht, et al

It is certified that error appears in the above-identified patent and that said Letters Patent is hereby corrected as shown below:

| | |
|---|---|
| Title Page, Abstract, line 5 after structural formula | Delete "$C_1$-Chd 6-alkyl" and substitute --$C_1$-$C_6$-alkyl-- |
| Col. 1, line 35 | After "Br" delete "$CH_3$" and substitute --$CF_3$-- |
| Col. 1, line 35 | After "Y-H," delete "CH" and substitute --$CH_3$-- |
| Col. 1, line 36 | After "$R^2=C_1$-" delete "c4" and substitute --$C_4$-- |
| Col. 1, line 40 | After "X=" delete "$C_1C_4$" and substitute --$C_1$-$C_4$-- |
| Col. 5, line 12 | Delete "signifies" and substitute --signify-- |

Signed and Sealed this

Twenty-first Day of July, 1992

Attest:

DOUGLAS B. COMER

*Attesting Officer*     *Acting Commissioner of Patents and Trademarks*